United States Patent [19]
Keus

[11] Patent Number: 6,068,234
[45] Date of Patent: May 30, 2000

[54] SETTING FOOT PROVIDED WITH SEALING MEANS

[76] Inventor: Elbert Christoffel Edward Richard Keus, Kaya Kiwa 3, Willemstad, Curacao, Netherlands Antilles

[21] Appl. No.: 09/142,904
[22] PCT Filed: Mar. 20, 1997
[86] PCT No.: PCT/NL97/00145
  § 371 Date: Oct. 15, 1998
  § 102(e) Date: Oct. 15, 1998
[87] PCT Pub. No.: WO97/35144
  PCT Pub. Date: Sep. 25, 1997

[30] Foreign Application Priority Data

Mar. 20, 1996 [NL] Netherlands ............................ 1002661

[51] Int. Cl.[7] .............................. F16M 1/00; F16M 11/24
[52] U.S. Cl. ........................................ 248/637; 248/188.4
[58] Field of Search ...................................... 248/637, 638, 248/677, 678, 615, 634, 635, 542, 188, 188.1, 188.2, 188.4, 188.8; 464/161; 277/549, 503, 321, 500, 571; 267/64.17, 64.24, 64.26

[56] References Cited

U.S. PATENT DOCUMENTS

| 2,385,045 | 9/1945 | Wallace ............................... 188/322.16 |
| 2,592,942 | 4/1952 | Moore . |
| 3,268,996 | 8/1966 | Luketa . |
| 3,891,199 | 6/1975 | Willich et al. ........................... 267/139 |
| 4,580,996 | 4/1986 | Brissette . |
| 4,877,223 | 10/1989 | Hackett ................................. 267/64.17 |
| 5,094,424 | 3/1992 | Hartway ................................... 248/600 |
| 5,636,831 | 6/1997 | Gubitz ................................... 267/64.24 |

FOREIGN PATENT DOCUMENTS 0 316 283  2/1995  European Pat. Off. .

*Primary Examiner*—Ramon O Ramirez
*Assistant Examiner*—David Heisey
*Attorney, Agent, or Firm*—Young & Thompson

[57] ABSTRACT

A setting foot (1) for positioning machines, for example, on a base, comprises two setting members (2, 8) which can be mutually vertically displaced with respect to one another by a screw thread. The upper setting member (8) comprises a spherical surface, along which a bearing plate (17) with a spherical surface can slide. A first flexible sealing ring (21) may be accommodated between the lower (2) and the upper setting member (8), and, in the event of rotation of the upper setting member (8), bridges the spacing between the two setting members (2, 8). As a result, contamination of the screw thread is prevented. A second sealing ring (27) may be positioned along the outer circumference of the bearing plate (17), so that the curved surfaces are protected from the lateral penetration of dirt or moisture. A height indication (23) may be accommodated along the outer circumference of the upper or lower setting member (2, 8), which height indication can be covered by the sealing element (21). A lower O-ring (25) may also be accommodated, in order to prevent the penetration of moisture or dirt along the underside of the setting foot (1).

3 Claims, 1 Drawing Sheet

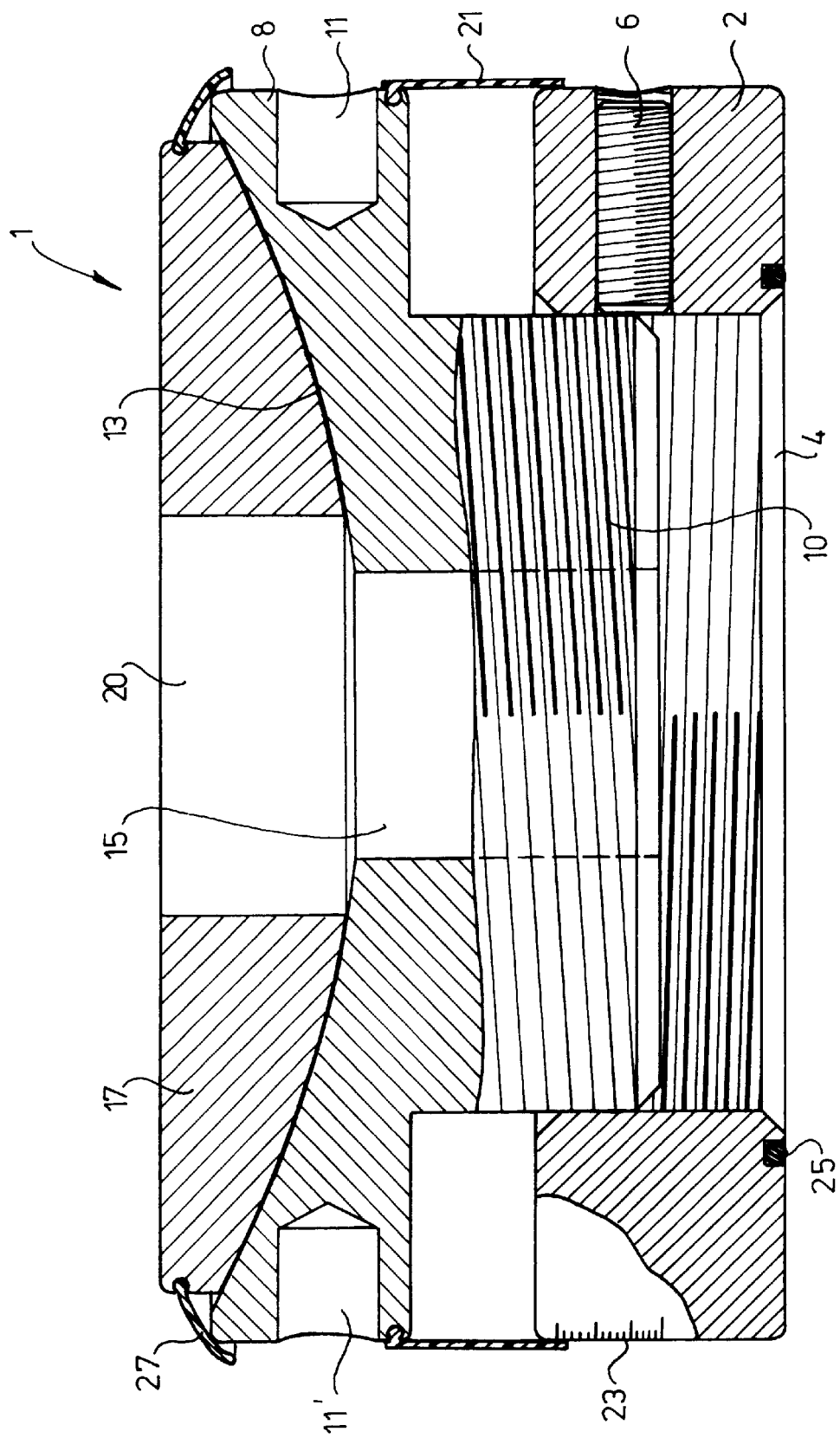

SETTING FOOT PROVIDED WITH SEALING MEANS

CROSS REFERENCE TO RELATED APPLICATION

This is the 35 USC §371 National Stage of International application PCT/NL97/00145 filed on Mar. 20, 1997, which designated the United States of America.

FIELD OF THE INVENTION

Setting foot provided with:

a lower setting member having a first screw thread and a central opening, a second setting member having, on its underside, a second screw thread which interacts with the first screw thread of the first setting member, and which second setting member comprises, on a top side, an upwardly concavely curved surface, a fastening hole extending from the curved surface as far as a bottom end face of the second setting member, and a bearing plate having a convex surface which is directed towards the curved surface of the second setting member and a throughbore which opens onto the first fastening hole.

BACKGROUND OF THE INVENTION

A setting foot of this kind is known from the European Patent EP-B-316,283. That patent describes a setting foot by means of which heavy machine components can be aligned accurately. In this case, the first setting member comprises a first ring with an internal screw thread on the inner wall of the central opening. The first ring of the setting foot is placed on a base, for example around a fastening bolt which extends through the central opening. The second setting member is likewise formed by a ring. The second ring engages by means of an external screw thread on the internal screw thread of the lower ring. The setting foot is vertically adjustable by rotating the rings with respect to one another. A machine which is positioned on the bearing plate can be screwed against the bearing plate by means of a nut and a bolt which runs from the base through the setting members. In this case, the curved surfaces of the bearing plate and the upper setting member interact such that the machine is aligned accurately.

A disadvantage of the known setting foot is that that part of the screw thread of the second ring which extends beyond the central opening of the first ring may be susceptible to contamination. As a result, a further vertical adjustment in the course of time is made more difficult, due to the fact that corrosion may occur or dirt may gather in the screw thread. The possibility of reuse of the known setting foot is likewise reduced as a result.

Furthermore, it has been found that that part of the curved surface of the upper setting member, or ring, which extends along the circumferential edge of the bearing plate is likewise susceptible to contamination and, as a result, may, for example, corrode.

Finally, it has been found that, in the event of a vertical adjustment of the setting foot by rotating the upper ring, it is possible for the screw thread of the upper ring to be rotated out of the screw thread of the central opening.

SUMMARY OF THE INVENTION

The object of the present invention is to provide a setting foot which avoids the abovementioned disadvantages.

To this end, a setting foot according to the invention is characterized in that a flexible sealing element is positioned around the central opening of the first setting member, which sealing element is connected, on the one hand, to the first or the second setting member and, on the other hand, interacts in a sealing manner with the other setting member and, in the event of rotation of the setting members with respect to one another bridges a varying spacing between the setting members. By providing a flexible material which, for example, on the one hand is connected to the upper setting member and on the other hand bears against the lower setting member, and which bridges the space between the upper and lower setting members, the screw thread is sufficiently protected from the environment. The sealing element may, for example, comprise a bellows which is connected to both the upper and the lower setting member and the length of which changes in the event of rotation of the setting members, or may be a ring made of a flexible material which is fixedly connected to one setting member and can slide freely along the other setting member.

A particularly advantageous setting foot, the first and the second setting members having essentially a cylindrical outer circumference with at least virtually identical external diameters, is characterized in that the sealing element comprises a ring made of a flexible material which, on the one hand, is fixedly connected to the outer circumference of the first or the second setting member and, on the other hand, can slide freely along the outer circumference of the other setting member in the event of rotation of the setting members with respect to one another.

In this way, a very simple and efficient seal is obtained which is operationally reliable and has a long service life. By way of example, the sealing element is fastened along the outer circumference of the upper setting member and bears in a clamping manner against the outer circumference of the lower setting member. In the event of rotation of the setting members, the loose lower end of the flexible sealing element slides in an axial direction along the outer circumference of the lower setting member, and ensures a suitable seal for any height of the second setting member.

In this embodiment, a height indication may advantageously be arranged on the outer circumference of the lower or the upper setting member, which height indication can be covered by the sealing element. The height indication may, for example, comprise a scale calibration which indicates how far the second setting member has rotated with respect to the first setting member, or may comprise a stop mark which indicates that no further rotation of the second setting member is possible without the screw thread becoming detached from that of the lower setting member.

In a further advantageous embodiment of a setting foot according to the invention, a second annular sealing element is, on the one hand, connected to the second setting member or to the bearing plate, in the region of the circumferential edge of the bearing plate, and, on the other hand, bears in a sealing manner against the bearing plate or against the setting member. In this manner, contamination of the curved surface of the second setting member and the bearing plate due to the lateral penetration of moisture or dirt can be prevented, while the bearing plate remains freely mobile with respect to the second setting member.

BRIEF DESCRIPTION OF THE DRAWINGS

The invention will be explained in more detail with reference to the appended single FIGURE, which depicts a cross-sectional view of a setting foot according to the invention.

DETAILED DESCRIPTION OF THE INVENTION

The figure shows a cross-sectional view of a setting foot 1 comprising a lower setting member or ring 2, an upper setting member or ring 8 and a bearing plate 17. The lower ring 2 is provided with a central opening 4 with an internal screw thread. A screw member 10 of the upper ring 8 is vertically adjustable in the central opening 4 by means of a complementary external screw thread formed on the screw member 10. On the top side, the upper ring 8 is provided with an upwardly concave surface 13. This surface interacts with a convex surface of the bearing plate 17. The bearing plate 17 and the upper ring 8 are each provided with a respective fastening hole 20, 15, through which the setting foot 1 can be fastened by means of, for example, a bolt between a base and a flange of a machine to be set. Using a suitable tool, the height of the upper ring 8 can be adjusted with respect to the lower ring 2 by means of recesses 11, 11' in the upper ring 8. The desired vertical position of the upper ring 8 with respect to the lower ring 2 can be locked by means of a securing bolt 6. A flexible sealing element 21, in the form of an annular rubber strip, is fastened in a recess along the outer circumference of the upper ring 8. In the event of rotation of the upper plate 8, the annular plastic or rubber strip 21 slides along the cylindrical outer circumference of the lower ring 2. As a result, dirt is effectively prevented from gathering in the screw thread of the screw member 10.

A height indication 23, in the form of a scale calibration, is arranged on the lower ring 2. By means of the sealing strip 21, the relative position of the upper ring 8 is indicated along the scale calibration 23.

A second annular sealing element 27 is fastened along a circumferential edge of the bearing plate 17 and bears in a clamping manner against the outer circumference of the upper ring 8. By means of the sealing element 27, contamination of the curved surface 13 by external substances or moisture is prevented, and corrosion thereof is counteracted.

The sealing elements 21 and 27 are preferably made of polyurethane with a Shore A hardness of 50–80.

Furthermore, an O-ring 25 is accommodated in a lower groove along the bottom of the lower ring 2, so that when the lower ring 2 is positioned on a flat base the central opening 4 is sealed, and moisture or dirt is prevented from contaminating the screw thread of the screw member 10 from the underside.

It should be noted that the setting foot has been described with reference to an exemplary embodiment in which the upper ring 8 is provided with an external screw thread and the lower ring 2 comprises an internal screw thread in the central opening 4. However, the invention also relates to embodiments in which the outer circumference of the lower ring 2 is provided with an external screw thread and the upper ring comprises an internal screw thread.

Furthermore, it is also possible to couple the sealing element 21 fixedly to the lower ring 2 and to design the latter such that it can be displaced along the upper ring 8. In the same way, the sealing element 27 may likewise be fixedly connected to the upper ring 8 and bear in a sealing manner against the bearing plate 17.

What is claimed is:

1. A setting foot comprising:

a first setting member having a central opening extending therethrough and being provided with an internal first screw thread;

a second setting member having, on its underside, a second screw thread which interacts with the first screw thread of the first setting member, said second setting member having, on a top side, an upwardly concavely curved surface, and a first fastening hole extending from the curved surface as far as a bottom end face of the second setting member;

a bearing plate having a convex surface which is directed towards the curved surface of the second setting member, a circumferential edge, and a through-bore which opens onto the first fastening hole;

a flexible sealing element positioned around the central opening of the first setting member, said sealing element a) being connected to one of the first and the second setting member, b) interacting in a sealing manner with the other setting member, and c) in the event of rotation of the setting members with respect to one another, bridging a varying space between the setting members;

an annular sealing member connected to one of the second setting member and the bearing plate in the region of the circumferential edge of the bearing plate, and bearing in a sealing manner against one of the bearing plate and the second setting member; and the first setting member being provided on the underside with a seal which is positioned in a groove extending around the central opening.

2. The setting foot according to claim 1, wherein the first and the second setting members have an essentially cylindrical outer circumference with substantially identical external diameters; the sealing element comprising a ring made of a flexible material which is fixedly connected to the outer circumference of one of the first and second setting members, and can slide freely along the outer circumference of the other setting member in the event of rotation of the setting members with respect to one another.

3. The setting foot according to claim 2, further comprising a height indicator arranged on the outer circumference of the setting member which is not fixedly connected to the sealing element, said height indicator structured and configured to be covered by the sealing element.

* * * * *